US012613169B2

(12) United States Patent

Su et al.

(10) Patent No.: US 12,613,169 B2

(45) Date of Patent: Apr. 28, 2026

(54) SYSTEM FOR CONFIGURING STANDARD GAS AND METHOD FOR CONFIGURING STANDARD GAS

(71) Applicant: Institute of Geology and Geophysics, Chinese Academy of Sciences, Beijing (CN)

(72) Inventors: Fei Su, Beijing (CN); Xuhang Zhang, Beijing (CN); Huaiyu He, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 71 days.

(21) Appl. No.: 19/232,295

(22) Filed: Jun. 9, 2025

(65) Prior Publication Data

US 2026/0049909 A1      Feb. 19, 2026

(30) Foreign Application Priority Data

Aug. 14, 2024 (CN) .......................... 202411112108.X

(51) Int. Cl.
G01N 1/38 (2006.01)
B01F 23/10 (2022.01)
(Continued)

(52) U.S. Cl.
CPC ................. G01N 1/38 (2013.01); G01N 1/24 (2013.01); B01F 23/19 (2022.01); B01F 2101/23 (2022.01)

(58) Field of Classification Search
CPC ........ G01N 1/38; G01N 1/24; B01F 2101/23; B01F 23/19
(Continued)

(56) References Cited

U.S. PATENT DOCUMENTS 8,171,876 B2 * 5/2012 Namekawa ................ B41J 2/18
347/85

FOREIGN PATENT DOCUMENTS

CN 104373809 A 2/2015
CN 105757448 A 7/2016
(Continued)

OTHER PUBLICATIONS

EP 0992732 A2—English Translation (Year: 2000).*
(Continued)

*Primary Examiner* — Christopher M Afful
(74) *Attorney, Agent, or Firm* — Hemisphere Law, PLLC; Zhigang Ma

(57) ABSTRACT

A system and a method for configuring standard gas are provided. The system includes a vacuum pump group, a main gas source, an auxiliary gas source, a mixing device and a storage device. The main input pipeline of the mixing device has an input end communicated with the main gas source and an output end communicated with a mixer, the main input pipeline has a first pneumatic valve and a second pneumatic valve at intervals; the auxiliary input pipeline has an input end communicated with the auxiliary gas source and an output end communicated with the mixer, the auxiliary input pipeline has a first manual valve and a second manual valve at intervals; an output pipeline has an input end communicated with the mixer and an output end communicated with the storage device, the output pipeline has a third pneumatic valve and a fourth pneumatic valve at intervals.

2 Claims, 1 Drawing Sheet

(51) Int. Cl.
    *B01F 101/23*        (2022.01)
    *G01N 1/24*         (2006.01)
(58) Field of Classification Search
    USPC ............................................................. 141/1
    See application file for complete search history.

(56) References Cited

FOREIGN PATENT DOCUMENTS

| | | | |
|---|---|---|---|
| CN | 115681805 A | 2/2023 | |
| CN | 117101448 A | 11/2023 | |
| EP | 0992732 A2 * | 4/2000 | ............ B01F 35/833 |

OTHER PUBLICATIONS

CNIPA, Decision of rejection for CN202411112108.X, Oct. 26, 2024.

Institute of Geology and Geophysics, Chinese Academy of Sciences (Applicant), Replacement claims (allowed) of CN202411112108.X, Nov. 13, 2024.

CNIPA, Decision of reexamination for CN202411112108.X, Jan. 6, 2025.

CNIPA, Notification to grant patent right for invention in CN202411112108.X, Jan. 10, 2025.

* cited by examiner

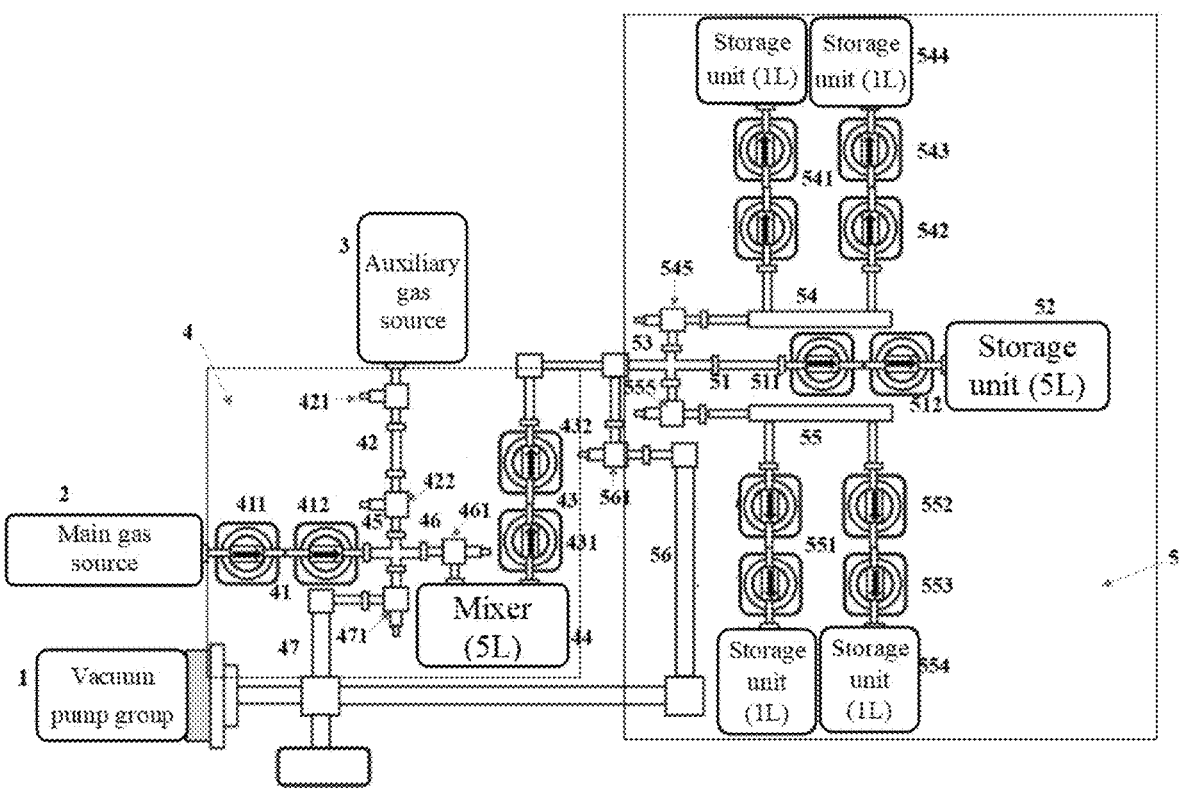

SYSTEM FOR CONFIGURING STANDARD GAS AND METHOD FOR CONFIGURING STANDARD GAS

TECHNICAL FIELD

The disclosure relates to the technical field of quantitative configuration of standard gases, and in particular to a system for configuring standard gas and a method for configuring standard gas.

BACKGROUND

The ratio of the extraterrestrial sample $^3He/^4He$ is usually greater than $10^{-3}$, the terrestrial sample $^3He/^4He$ is usually less than $10^{-5}$, noble gas mass spectrometers are all equipped with a Nier-type ion source which is sensitive to gas pressure, and the mass discrimination effects at different pressures are significantly different. This allows for uncontrollable mass discrimination effects when the sample is calibrated with conventional air, especially significant in helium isotopes. Therefore, it is necessary to formulate standard gases with different He isotope characteristics to correct He data of different samples.

The existing standard gas preparation method is mainly a weighing method, and the required device is a gas distribution device and a weighing device. The gas distribution device includes a vacuum pump, a vacuum gauge, a high pressure gauge, a low pressure gauge, a valve, a gas cylinder fixture, a chassis, and the like. The weighing device is a high-precision balance. Since the mass of the gas cylinder loaded with the gas is relatively large, usually up to 20 kg, the quality of the target gas that needs to be filled is lower than the gram level.

In order to accurately weigh a small amount of gas filled in a large-capacity gas cylinder, it is not only necessary to have high requirements for the precision of the balance, but also to ensure a certain weighing quantity. For component gases with excessively small masses, a multiple dilution method is employed for preparation. During the weighing operation, various measures must be taken to ensure that the weighing is achieved with high accuracy. Furthermore, the gravimetric method typically does not use high-purity gases for mixture preparation, especially for helium isotopes, where nitrogen is commonly employed as the balancing gas. This introduces significant uncertainty for subsequent high-precision measurements of helium isotopes.

SUMMARY

In view of the shortcomings of the prior art mentioned above, it is an object of the present disclosure to provide a system and a method for configuring noble gas standard gas, and in particular to mix $^3He$ and $^4He$ gases in a predetermined ratio. Specifically, precise configuration is carried out by means of free diffusion of gas. In addition, the high vacuum configuration system accurately realizes the mixing of $^3He$ and $^4He$ gases according to the predetermined ratio, and the configured gases are capable of being subpackaged for many times and remains usable for several decades.

In order to achieve the above objects and other related objects, the present disclosure is obtained through the following technical scheme.

The disclosure provides a system for configuring standard gas, including a vacuum pump group, a main gas source, an auxiliary gas source, a mixing device and a storage device connected through pipelines;

the vacuum pump group is used for keeping the system in a vacuum state;

the mixing device includes a main input pipeline, an auxiliary input pipeline, an output pipeline and a mixer;

the input end of the main input pipeline is communicated with the main gas source, the output end is communicated with the mixer, and a first pneumatic valve and a second pneumatic valve are arranged on the main input pipeline at intervals;

the input end of the auxiliary input pipeline is communicated with the auxiliary gas source, and the output end is communicated with the mixer, and the auxiliary input pipeline is provided with a first manual valve and a second manual valve at intervals;

the input end of the output pipeline is communicated with the mixer, and the output end is communicated with the storage device;

the output pipeline is provided with a third pneumatic valve and a fourth pneumatic valve at intervals.

In a feasible embodiment, a storage volume between the first pneumatic valve and the second pneumatic valve is 0.05-1 mL. Optionally, the storage volume may be 0.05 mL, 0.1 mL, 0.2 mL, 0.3 mL, 0.4 mL, 0.5 mL, 0.6 mL, 0.7 mL, 0.8 mL, 0.9 mL or 1 mL.

In a feasible embodiment, a storage volume between the first manual valve and the second manual valve is 15-50 mL. Optionally, the storage volume may be 15 mL, 20 mL, 25 mL, 30 mL, 35 mL, 40 mL, 45 mL, 50 mL.

In a feasible embodiment, a storage volume between the third pneumatic valve and the fourth pneumatic valve is 0.05-1 mL. Optionally, the storage volume may be 0.05 mL, 0.1 mL, 0.2 mL, 0.3 mL, 0.4 mL, 0.5 mL, 0.6 mL, 0.7 mL, 0.8 mL, 0.9 mL or 1 mL.

In a feasible embodiment, the mixing device includes a first cross, a general input pipeline and a first vacuum pipeline; four ports of the first cross are respectively communicated with the output end of the general input pipeline, the output end of the auxiliary input pipeline, the input end of the general input pipeline and the input end of the first vacuum pipeline, and the output end of the general input pipeline is communicated with the mixer, and the output end of the first vacuum pipeline is communicated with the vacuum pump group.

In a feasible embodiment, the output end of the main input pipeline is provided with a fourth manual valve; the first vacuum pipeline is provided with a third manual valve.

In a feasible embodiment, the storage device includes a storage pipeline and a storage unit; one end of the storage pipeline is communicated with the output pipeline, and the other end is communicated with the storage unit; and a fifth pneumatic valve and a sixth pneumatic valve are arranged on the storage pipeline at intervals.

In a feasible embodiment, the storage device includes a second cross, a first main branch pipeline and a second main branch pipeline;

the storage pipeline includes a front storage pipeline and a rear storage pipeline, the input end of the front storage pipeline is communicated with the output pipeline, the rear storage pipeline is communicated with the storage unit, and the fifth pneumatic valve and the sixth pneumatic valve are arranged on the rear storage pipeline at intervals;

four ports of the second cross are respectively communicated with the output end of the front storage pipeline, the input end of the rear storage pipeline, the input end of the first main branch pipeline and the input end of the second main branch pipeline.

In a feasible embodiment, the storage device further includes a plurality of first secondary branch pipelines arranged in parallel and respectively communicated with the first main branch pipeline and a plurality of second secondary branch pipelines arranged in parallel and respectively communicated with the second main branch pipeline;

each first secondary branch pipeline is respectively provided with a seventh pneumatic valve and an eighth pneumatic valve arranged at intervals, and each first secondary branch pipeline is respectively connected with a first storage unit;

each second secondary branch pipeline is respectively provided with a ninth pneumatic valve and a tenth pneumatic valve arranged at intervals, and each second secondary branch pipeline is respectively connected with a second storage unit.

In a feasible embodiment, the input end of the first main branch pipeline is provided with a sixth manual valve, and the input end of the second main branch pipeline is provided with a seventh manual valve.

In a feasible embodiment, the storage device includes a second vacuum pipeline, the second vacuum pipeline is communicated with the front storage pipeline, and the second vacuum pipeline is provided with a fifth manual valve.

In some feasible embodiments, the material of the pipelines is 316L stainless steel; and/or the manual valves are made of metal; and/or the vacuum pump group maintains the system vacuum within the range of 0.1 to $6 \times 10-6$ Pa; and/or the main gas source is a $^3$He gas tank, and the auxiliary gas source is a $^4$He gas tank.

The second aspect of the disclosure provides a method for configuring standard gas, applying the system for configuring standard gas described in the first aspect, and including the following steps:

1) maintaining the entire system at a vacuum level of $10^{-6}$ Pa with the vacuum pump group;

2) taking first gas with a volume of V1 from the auxiliary gas source: opening the first manual valve, balancing for 1-5 min, and closing the first manual valve, storing the first gas with the volume of V1 between the first manual valve and the second manual valve;

taking second gas with a volume of V2 from the main gas source: opening the first pneumatic valve, balancing for 1-5 min, and closing the first pneumatic valve, storing the second gas with the volume of V2 between the first pneumatic valve and the second pneumatic valve;

3) mixing the first gas and the second gas: blocking a communication between the vacuum pump group and system pipelines, opening the second pneumatic valve and the second manual valve, balancing for 5-20 min, and storing the mixed gas in the mixer;

4) subpackaging the mixed gas with a volume of V3: opening the third pneumatic valve, balancing for 1-5 min, and closing the third pneumatic valve, storing the mixed gas with the volume of V3 between the third pneumatic valve and the fourth pneumatic valve; and 5) opening the fourth pneumatic valve, and inputting the mixed gas with the volume of V3 into the storage device; specifically, opening the fourth pneumatic valve, the fifth pneumatic valve, the sixth pneumatic valve, the seventh pneumatic valve, the eighth pneumatic valve, the ninth pneumatic valve and the tenth pneumatic valve, balancing for 5-20 min, closing the pneumatic valves, and feeding the mixed gas enters the storage unit, each first storage unit and each second storage unit respectively.

In some feasible embodiments, V1=15-50 mL, V2=0.05-1 mL, and V3=0.05-1 mL;

and/or the second gas is $^3$He gas and the first gas is $^4$He gas.

To sum up, the disclosure has at least the following beneficial effects:

The system and the method for configuring the noble gas standard gas are capable of mixing at least two isotope gases in a predetermined ratio. Precise configuration is carried out by means of free diffusion of gas. In addition, the high vacuum configuration system accurately realizes the mixing of $^3$He and $^4$He gases according to the predetermined ratio, and the configured gases are capable of being subpackaged for many times and remains usable for several decades.

BRIEF DESCRIPTION OF THE DRAWING

FIG. 1 is a schematic structural diagram of a system for configuring a noble gas standard gas according to the present disclosure.

REFERENCE NUMERALS IN THE FIGURE

1. vacuum pump group; 2. main gas source; 3. auxiliary gas source; 4. mixing device; 41. main input pipeline; 411. first pneumatic valve; 412. second pneumatic valve; 42. auxiliary input pipeline; 421. first manual valve; 422. second manual valve; 43. output pipeline; 431. third pneumatic valve; 432. fourth pneumatic valve; 44. mixer; 45. first cross; 46. general input pipeline. 461. fourth manual valve; 47. first vacuum pipeline; 471. third manual valve; 5. storage device; 51. storage pipeline; 511. fifth pneumatic valve; 512. sixth pneumatic valve; 52. storage unit; 53. second cross; 54. first main branch pipeline; 541. first secondary branch pipeline; 542. seventh pneumatic valve; 543. eighth pneumatic valve; 544. first storage unit; 545. sixth manual valve; 55. second main branch pipeline; 551. second secondary branch pipeline; 552. ninth pneumatic valve; 553. tenth pneumatic valve; 554. second storage unit; 555. seventh manual valve; 56. second vacuum pipeline; and 561. fifth manual valve.

DETAILED DESCRIPTION OF THE EMBODIMENTS

Noble gas mass spectrometers are all equipped with a Nier-type ion source sensitive to gas pressure, and the mass discrimination effects at different pressures are significantly different. This allows for uncontrollable mass discrimination effects when the sample is calibrated with conventional air, especially significant in helium isotopes. Therefore, it is necessary to formulate standard gases with different He isotope characteristics to correct different samples. The disclosure aims to realize the accurate mixing of at least two isotope gases according to the predetermined ratio through the free diffusion of gases, and the configured gases are capable of being subpackaged for many times and remains usable for several decades.

The embodiments of the present disclosure are described below by specific embodiments, and those skilled in the art can easily understand other advantages and effects of the present disclosure from the content disclosed in the present disclosure. Before further describing specific embodiments of the present disclosure, it should be understood that the scope of protection of the present disclosure is not limited to the specific embodiments described below; it should also be understood that the terminology used in the embodiments of the present disclosure is for the purpose of describing particular embodiments and is not intended to limit the scope of the present disclosure. In the following embodiments, no test method with specific conditions is indicated, usually according to conventional conditions, or according to the conditions suggested by each manufacturer.

When a numerical range is given in the embodiments, it should be understood that, unless otherwise specified in the present disclosure, any numerical value between two endpoints of each numerical range and two endpoints may be selected. Unless otherwise defined, all technical and scientific terms used in the present disclosure have the same meaning as commonly understood by a person skilled in the art. In addition to the specific methods, apparatuses, and materials used in the embodiments, any method, device, and material in the prior art similar to or equivalent to the methods, apparatuses, and materials described in the embodiments of the present disclosure may also be used to implement the present disclosure according to the understanding of the prior art and the disclosure of the present disclosure by those skilled in the art.

Embodiment 1

Referring to FIG. 1, a system for configuring a standard gas includes a vacuum pump group 1, a main gas source 2, an auxiliary gas source 3, a mixing device 4 and a storage device 5 connected through pipelines. The vacuum pump group 1 is used for keeping the system in a vacuum state. The mixing device 4 includes a main input pipeline 41, an auxiliary input pipeline 42, an output pipeline 43 and a mixer 44. The input end of the main input pipeline 41 is communicated with the main gas source 2, and the output end is communicated with the mixer 44, and the main input pipeline 41 is provided with a first pneumatic valve 411 and a second pneumatic valve 412 at intervals. The input end of the auxiliary input pipeline 42 is communicated with the auxiliary gas source 3, and the output end is communicated with the mixer 44, and the auxiliary input pipeline 42 is provided with a first manual valve 421 and a second manual valve 422 at intervals. The input end of the output pipeline 43 is communicated with the mixer 44, and the output end is communicated with the storage device 5. The output pipeline 43 is provided with a third pneumatic valve 431 and a fourth pneumatic valve 432 at intervals.

Specifically, interfaces between the main gas source 2 and the auxiliary gas source 3 and the pipelines are CGA interfaces, and then the main gas source 2 and the auxiliary gas source 3 are connected to the pipelines through CGA and CF, and the other structures are CF interfaces, which ensures the vacuum degree of the pipeline system and enables the main gas source 2, the auxiliary gas source 3 and the mixer 44 to be replaced. Specifically, the main gas source 2 and the auxiliary gas source 3 are connected to the pipelines through the CGA and the CF, the remaining structures are CF interfaces, the vacuum degree of the pipeline system is ensured, and enables interchangeable deployment of the main gas source 2, the auxiliary gas source 3 and the mixer 44.

Specifically, the number of the main gas source 2 and the auxiliary gas source 3 is set according to the specific configuration requirements, for example, the main gas source 2 is provided with a $^3$He gas tank, and the auxiliary gas source 3 is provided with a $^4$He gas tank. For a three-isotope configuration, the system allows for the addition of main or auxiliary gas sources.

More specifically, the storage volume between the first pneumatic valve 411 and the second pneumatic valve 412 may be used to select a suitable type of pneumatic valve and a suitable volume of pipeline connecting the two pneumatic valves as needed, or the pipeline connecting the first pneumatic valve 411 and the second pneumatic valve 412 is configured to be detachably replaced, that is, the pipeline between the two pneumatic valves is detachably connected to the first pneumatic valve 411 and the second pneumatic valve 412, so that replacement may be performed according to specific configuration requirements. Similarly, the pipeline connecting the first manual valve 421 and the second manual valve 422, and the pipeline connecting the third pneumatic valve 431 and the fourth pneumatic valve 432 may all be similarly arranged. Therefore, the system in this embodiment enables both precise preparation of gas mixtures at desired ratios and flexible replacement/partitioning operations as needed.

In a specific example, a storage volume between the first pneumatic valve 411 and the second pneumatic valve 412 is 0.05-1 mL. 0.1 mL in this embodiment. It is worth noting that the storage volume between the first pneumatic valve 411 and the second pneumatic valve 412 is the storage volume stored in the first pneumatic valve 411 and the second pneumatic valve 412 and the pipeline connecting the first pneumatic valve 411 and the second pneumatic valve 412.

In a specific example, a storage volume between the first manual valve 421 and the second manual valve 422 is 15 to 50 mL. 30 mL in this embodiment. Similarly, the storage volume between the first manual valve 421 and the second manual valve 422 is the storage volume stored in the first manual valve 421 and the second manual valve 422 and the pipeline connecting the first manual valve 421 and the second manual valve 422.

In a specific example, a storage volume between the third pneumatic valve 431 and the fourth pneumatic valve 432 is 0.05-1 mL. 0.1 mL in this embodiment. It is worth noting that the storage volume between the third pneumatic valve 431 and the fourth pneumatic valve 432 is the storage volume in the third pneumatic valve 431 and the fourth pneumatic valve 432 and the pipeline connecting the third pneumatic valve 431 and the fourth pneumatic valve 432.

In a specific example, the mixing device 4 includes a first cross 45, a general input pipeline 46 and a first vacuum pipeline 47. The four ports of the first cross 45 are respectively communicated with the output end of the main input pipeline 41, the output end of the auxiliary input pipeline 42, the input end of the general input pipeline 46 and the input end of the first vacuum pipeline 47, and the output end of the general input pipeline 46 is communicated with the mixer 44, and the output end of the first vacuum pipeline 47 is communicated with the vacuum pump group 1. In a specific example, the output end of the general input pipeline 46 is provided with a fourth manual valve 461. The purpose of setting the fourth manual valve 461 is to close the fourth manual valve 461 and the third pneumatic valve 431 and the fourth pneumatic valve 432 after the mixed gas is stored in the mixer 44, thus forming a closed system, and this part of gas can be reserved for later use. If additional gas mixtures with different isotopic ratios are required, only this specific section needs to be replaced.

In a specific example, the first vacuum pipeline 47 is provided with a third manual valve 471, and the connection and disconnection between the vacuum pump group 1 and the system pipeline are controlled by the third manual valve 471.

In a specific example, the storage device 5 includes a storage pipeline 51 and a storage unit 52; one end of the storage pipeline 51 is communicated with the output pipeline 43, and the other end is communicated with the storage unit 52; and the storage pipeline 51 is provided with a fifth pneumatic valve 511 and a sixth pneumatic valve 512 at intervals, and the enclosed space between the fifth pneumatic valve 511 and the sixth pneumatic valve 512 forms a quantitative volume. When the gas to be measured is stored in the storage unit 52, the fifth pneumatic valve 511 and the sixth pneumatic valve 512 are closed, and the storage unit 52, the fifth pneumatic valve 511 and the sixth pneumatic valve 512 are capable of being taken down from this system to any system for testing noble gas isotopes for measurement, and quantitative sampling is carried out by using the quantitative volume between the fifth pneumatic valve 511 and the sixth pneumatic valve 512.

In a specific example, the storage device 5 includes a second cross 53, a first main branch pipe 54 and a second main branch pipeline 55. The storage pipeline 51 includes a front storage pipeline and a rear storage pipeline, where the input end of the front storage pipeline is communicated with the output pipeline 43, and the rear storage pipeline is communicated with the storage unit 52, and the rear storage pipeline is provided with a fifth pneumatic valve 511 and a sixth pneumatic valve 512 at intervals. The four ports of the second cross 53 are respectively communicated with the output end of the front storage pipeline, the input end of the rear storage pipeline, the input end of the first main branch pipeline 54 and the input end of the second main branch pipeline 55. Through the arrangement of the first main branch pipeline 54 and the second main branch pipeline 55, the system is flexible to use, and adapts to the requirements of different volumes and different quantities of packaging.

In a specific example, the storage device 5 further includes a plurality of first secondary branch pipelines 541 arranged in parallel and respectively communicated with the first main branch pipeline 54. A plurality of second secondary branch pipelines 551 arranged in parallel and respectively communicated with the second main branch pipeline 55. Each first secondary branch pipeline 541 is respectively provided with a seventh pneumatic valve 542 and an eighth pneumatic valve 543 arranged at intervals, and each first secondary branch pipeline 541 is respectively connected with a first storage unit 544. Each second secondary branch pipeline 551 is respectively provided with a ninth pneumatic valve 552 and a tenth pneumatic valve 553 arranged at intervals, and each second secondary branch pipeline 551 is respectively connected with a second storage unit 554. Specifically, the numbers of the first secondary branch pipelines 541 and the second secondary branch pipelines 551 are set as required. In this embodiment, referring to FIG. 1, two parallel first secondary branch pipelines 541 and two parallel second secondary branch pipelines 551 are set. Here, the purpose of setting the seventh pneumatic valve 542, the eighth pneumatic valve 543 and the first storage unit 544, and the purpose of setting the ninth pneumatic valve 552, the tenth pneumatic valve 553 and the second storage unit 554 are all similar to the purpose of setting the fifth pneumatic valve 511, the sixth pneumatic valve 512 and the storage unit 52, that is, each storage unit, together with the enclosed area formed by its connected pneumatic valves, can be detached and transferred to any noble gas isotope measurement system for testing.

In a specific example, the input end of the first main branch pipeline 54 is provided with a sixth manual valve 545, and the input end of the second main branch pipeline 55 is provided with a seventh manual valve 555. As mentioned above, as shown in FIG. 1, the two first storage units 544, the two second storage units 554 and the storage unit 52, together with their two start valves, can be moved to other noble gas testing systems for testing. The functions of the sixth manual valve 545 and the seventh manual valve 555 are to ensure that one more valve and one more layer of gas are sealed, and on the other hand, the second cross 53 is not exposed to the atmosphere after the storage is removed.

In a specific example, the storage device 5 includes a second vacuum pipeline 56, the second vacuum pipeline 56 is communicated with the front storage pipeline, and the second vacuum pipeline 56 is provided with a fifth manual valve 561. Because the volume between the third pneumatic valve 431 and the fourth pneumatic valve 432 is small and the pipeline is narrow, it is necessary to set a second vacuum pipeline 56 to connect the vacuum pump group 1 to ensure the vacuum degree requirement of the storage device 5. It is worth noting that this system needs to maintain the vacuum degree of each part of the system in order to accurately realize the configuration of isotopes with a specific ratio and ensure multiple subpackaging.

In some specific examples, the pipelines are made of 316L stainless steel, and the manual valves are made of metal. The vacuum pump group can maintain the vacuum degree of the system at $(0.1\text{-}6) \times 10^{-6}$ Pa, preferably at the order of $10^{-6}$ Pa.

Embodiment 2

A test method is provided, and is carried out by using the test system of Embodiment 1, as follows:

1) maintaining the entire system at a vacuum level of $10^{-6}$ Pa with the vacuum pump group 1, specifically, $3 \times 10^{-6}$ Pa;

2) taking $^4$He gas with a volume of V1 from the auxiliary gas source 3: opening the first manual valve 421, balancing for 2 min, and closing the first manual valve 421, and storing the $^4$He gas with the volume of V1 between the first manual valve 421 and the second manual valve 422, with V1=30 mL;

taking $^3$He gas with a volume of V2 from the main gas source 2: opening the first pneumatic valve 411, balancing for 2 min, and closing the first pneumatic valve 411, and storing V2 volume of second gas between the first pneumatic valve 411 and the second pneumatic valve 412, with V2=0.1 mL;

mixing the first gas and the second gas: by closing the third manual valve 471 to block the communication between the vacuum pump group 1 and the system pipelines, opening the second pneumatic valve 412, the second manual valve 422 and the fourth manual valve 461, balancing for 10 min, closing the second pneumatic valve 412, the second manual valve 422 and the fourth manual valve 461, and storing the mixed gas in the mixer 44 for storage, the mixer 44 is mixing tank (5L);

4) subpackaging the mixed gas with a volume of V3: opening the third pneumatic valve 431, balance for 2 min, and closing the third pneumatic valve 431, storing the mixed gas with the volume of V3 between the third pneumatic valve 431 and the fourth pneumatic valve 432; and 5) opening the fourth pneumatic valve 432, the fifth pneumatic valve 511 and the sixth pneumatic valve

512, and inputting the mixed gas with the volume of V3 into the storage device 5, and the storage device 5 is a Test Tank (5L).

Embodiment 3

When configuring a 1L gas container, the operational procedure requires first replacing the existing 5L test tank (storage device) with a 1L test tank (storage device), followed by these steps:

After step 4) of Embodiment 2, opening the fifth pneumatic valve 511, the sixth pneumatic valve 512, the seventh pneumatic valve 542, the eighth pneumatic valve 543, the ninth pneumatic valve 552 and the tenth pneumatic valve 553, and balancing for 5-20 min, closing the pneumatic valves and feeding the mixed gas enters the storage unit 52, the first storage unit 544 and the second storage unit 554 respectively. The storage unit 52 serves as a Test Tank (1L), and the two first storage units 544 and each second storage unit 554 serve as a send tank (1L).

The embodiments are merely illustrative of the principles and effects of the present disclosure, but are not intended to limit the present disclosure. Those skilled in the art can modify or change the above embodiments without departing from the spirit and scope of the present disclosure. Therefore, all equivalent modifications or changes made by a person of ordinary skill in the art without departing from the spirit and technical idea disclosed by the disclosure should still be covered by the claims of the disclosure.

What is claimed is:

1. A system for configuring standard gas, comprising a vacuum pump group (1), a main gas source (2), an auxiliary gas source (3), a mixing device (4) and a storage device (5) connected through pipelines;

the vacuum pump group (1) is configured to keep the system in a vacuum state;

wherein the mixing device (4) comprises a main input pipeline (41), an auxiliary input pipeline (42), an output pipeline (43) and a mixer (44);

wherein the input end of the main input pipeline (41) is communicated with the main gas source (2), the output end is communicated with the mixer (44), and a first pneumatic valve (411) and a second pneumatic valve (412) are arranged on the main input pipeline (41) at intervals;

wherein the input end of the auxiliary input pipeline (42) is communicated with the auxiliary gas source (3), the output end is communicated with the mixer (44), and the auxiliary input pipeline (42) is provided with a first manual valve (421) and a second manual valve (422) at intervals;

wherein the input end of the output pipeline (43) is communicated with the mixer (44), and the output end is communicated with the storage device (5);

wherein the output pipeline (43) is provided with a third pneumatic valve (431) and a fourth pneumatic valve (432) at intervals;

wherein the storage device (5) comprises a storage pipeline (51) and a storage unit (52);

wherein one end of the storage pipeline (51) is communicated with the output pipeline (43), and the other end is communicated with the storage unit (52); and a fifth pneumatic valve (511) and a sixth pneumatic valve (512) are arranged on the storage pipeline (51) at intervals;

wherein the storage device (5) comprises a second cross (53), a first main branch pipeline (54) and a second main branch pipeline (55);

wherein the storage pipeline (51) comprises a front storage pipeline and a rear storage pipeline, the input end of the front storage pipeline is communicated with the output pipeline (43), and the rear storage pipeline is communicated with the storage unit (52), and the fifth pneumatic valve (511) and the sixth pneumatic valve (512) are arranged on the rear storage pipeline at intervals;

wherein four ports of the second cross (53) are respectively communicated with the output end of the front storage pipeline, the input end of the rear storage pipeline, the input end of the first main branch pipeline (54) and the input end of the second main branch pipeline (55), wherein through an arrangement of the first main branch pipeline (54) and the second main branch pipeline (55), the system adapts to split charging requirements of different volumes and adapts to different numbers of split charging requirements;

wherein the input end of the first main branch pipeline (54) is provided with a sixth manual valve (545), and the input end of the second main branch pipeline (55) is provided with a seventh manual valve (555);

wherein the vacuum pump group is configured to maintain the vacuum degree of the system at $(0.1\text{-}6)\times10^{-6}$ pascals (Pa);

wherein the mixing device (4) comprises a first cross (45), a general input pipeline (46) and a first vacuum pipeline (47);

wherein four ports of the first cross (45) are respectively communicated with the output end of the main input pipeline (41), the output end of the auxiliary input pipeline (42), the input end of the general input pipeline (46) and the input end of the first vacuum pipeline (47), and the output end of the general input pipeline (46) is communicated with the mixer (44), and the output end of the first vacuum pipeline (47) is communicated with the vacuum pump group (1);

wherein the output end of the general input pipeline (46) is provided with a fourth manual valve (461);

wherein a storage volume between the first pneumatic valve (411) and the second pneumatic valve (412) is 0.05-1 milliliter (mL), wherein the storage volume between the first pneumatic valve (411) and the second pneumatic valve (412) is the storage volume stored in the first pneumatic valve (411) and the second pneumatic valve (412) and the pipeline connecting the first pneumatic valve (411) and the second pneumatic valve (412);

wherein a storage volume between the first manual valve (421) and the second manual valve (422) is 15-50 mL, wherein the storage volume between the first manual valve (421) and the second manual valve (422) is the storage volume stored in the first manual valve (421) and the second manual valve (422) and the pipeline connecting the first manual valve (421) and the second manual valve (422);

wherein a storage volume between the third pneumatic valve (431) and the fourth pneumatic valve (432) is 0.05-1 mL, wherein the storage volume between the third pneumatic valve (431) and the fourth pneumatic valve (432) is the storage volume in the third pneumatic valve (431) and the fourth pneumatic valve (432) and the pipeline connecting the third pneumatic valve (431) and the fourth pneumatic valve (432);

wherein the first vacuum pipeline (47) is provided with a third manual valve (471);

wherein the storage device (5) further comprises a plurality of first secondary branch pipelines (541) arranged in parallel and respectively communicated with the first main branch pipeline (54);

a plurality of second secondary branch pipelines (551) arranged in parallel and respectively communicated with the second main branch pipeline (55);

wherein each first secondary branch pipeline (541) is respectively provided with a seventh pneumatic valve (542) and an eighth pneumatic valve (543) arranged at intervals, and each first secondary branch pipeline (541) is respectively connected with a first storage unit (544);

wherein each second secondary branch pipeline (551) is respectively provided with a ninth pneumatic valve (552) and a tenth pneumatic valve (553) arranged at intervals, and each second secondary branch pipeline (551) is respectively connected with a second storage unit (554);

the storage device (5) comprises a second vacuum pipeline (56), the second vacuum pipeline (56) is communicated with the front storage pipeline, and the second vacuum pipeline (56) is provided with a fifth manual valve (561);

wherein the material of each pipeline is 316L stainless steel;

wherein the manual valves are made of metal;

wherein the main gas source (2) is a $^3$He gas tank, and the auxiliary gas source (3) is a $^4$He gas tank;

wherein the system is further configured to form a closed system by closing the fourth manual valve (461), the third pneumatic valve (431) and the fourth pneumatic valve (432), when the mixed gas is stored in the mixer (44);

the fifth pneumatic valve (511) and the sixth pneumatic valve (512) are configured to close and enable measurement of gas stored in the storage unit (52), and the system is configured to perform quantitative sampling by using the quantitative volume between the fifth pneumatic valve (511) and the sixth pneumatic valve (512).

2. A method for configuring standard gas by using the system as claimed in claim 1, comprising the following steps:

1) System preparation: maintaining the entire system at a vacuum level of $10^{-6}$ Pa with the vacuum pump group (1);

2) Taking a first gas with a volume of V1 from the auxiliary gas source (3) by opening the first manual valve (421), balancing for 1-5 min, and closing the first manual valve (421), storing the first gas with the volume of V1 between the first manual valve (421) and the second manual valve (422);

taking a second gas with a volume of V2 from the main gas source (2) by opening the first pneumatic valve (411), balancing for 1-5 min, and closing the first pneumatic valve (411), storing the second gas with the volume of V2 between the first pneumatic valve (411) and the second pneumatic valve (422);

3) Mixing the first gas and the second gas by blocking a communication between the vacuum pump set (1) and system pipelines, opening the second pneumatic valve (412) and the second manual valve (422), balancing for 5-20 min, and storing the mixed gas in the mixer (44);

4) Subpackaging the mixed gas with a volume of V3 by opening the third pneumatic valve (431), balancing for 1-5 min, and closing the third pneumatic valve (431), storing the mixed gas with the volume of V3 between the third pneumatic valve (431) and the fourth pneumatic valve (432);

5) Opening the fourth pneumatic valve (432), and inputting the mixed gas with the volume of V3 into the storage device (5);

after step 4), opening the fourth pneumatic valve (432), the fifth pneumatic valve (511), the sixth pneumatic valve (512), the seventh pneumatic valve (542), the eighth pneumatic valve (543), the ninth pneumatic valve (552) and the tenth pneumatic valve (553), balancing for 5-20 min, closing the pneumatic valves, and feeding the mixed gas enters into the storage unit (52), each first storage unit (544) and each second storage unit (554) respectively;

wherein the volume of V1 is in a range of 15 mL to 50 mL, the volume of V2 is in a range of 0.05 ml to 1 mL, and the volume of V3 is in a range of 0.05 mL to 1 mL; and wherein the second gas is $^3$He gas, and the first gas is $^4$He gas.

* * * * *